(12) United States Patent
Eigenberger et al.

(10) Patent No.: US 8,377,257 B2
(45) Date of Patent: Feb. 19, 2013

(54) COMPACT TOTAL EVAPORATOR AND DEVICE FOR CARRYING OUT THE CONTROLLED DRYING, EVAPORATION AND/OR REACTION OF A NUMBER OF FLUIDS

(75) Inventors: Gerhart Eigenberger, Neustadt/Weinstrasse (DE); Gerhard Friedrich, Illingen (DE); Gudrun Friedrich, legal representative, Illingen (DE); Andreas Freund, Stuttgart (DE); Grigorios Kolios, Lörrach (DE); Clemens Merten, Stuttgart (DE); Jens Bernnat, Öhringen (DE)

(73) Assignee: Universitat Stuttgart, Stuttgart (DE)

( * ) Notice: Subject to any disclaimer, the term of this patent is extended or adjusted under 35 U.S.C. 154(b) by 1134 days.

(21) Appl. No.: 11/914,769

(22) PCT Filed: May 19, 2006

(86) PCT No.: PCT/DE2006/000866
§ 371 (c)(1),
(2), (4) Date: May 12, 2008

(87) PCT Pub. No.: WO2006/125417
PCT Pub. Date: Nov. 30, 2006

(65) Prior Publication Data
US 2008/0230184 A1 Sep. 25, 2008

(30) Foreign Application Priority Data
May 20, 2005 (DE) .......................... 10 2005 023 956

(51) Int. Cl.
*B01D 1/00* (2006.01)
*B01D 3/00* (2006.01)
*B01B 1/00* (2006.01)
*B01J 19/00* (2006.01)
*F25B 39/02* (2006.01)

(52) U.S. Cl. ............... 159/15; 62/515; 165/61; 165/108; 165/184; 159/16.1; 159/18; 159/26.1; 159/27.3; 159/901; 202/235; 202/238; 203/21; 203/39; 203/49; 203/98; 203/100; 422/42; 422/244

(58) Field of Classification Search ................... 159/15, 159/18, 16.1, 26.1, 27.3, 901, DIG. 1, DIG. 23; 202/235, 238; 203/21, 39, 49, 98, 99, 100; 422/42, 244; 62/515; 165/61, 108, 184
See application file for complete search history.

(56) References Cited

U.S. PATENT DOCUMENTS 1,526,683 A * 2/1925 Seavey ........................ 392/480
3,914,096 A * 10/1975 Schladitz ..................... 431/208

(Continued)

FOREIGN PATENT DOCUMENTS

| DE | 3628994 | 3/1988 |
|---|---|---|
| DE | 4029260 | 5/1992 |
| DE | 19723680 | 12/1998 |

*Primary Examiner* — Virginia Manoharan
(74) *Attorney, Agent, or Firm* — Renner, Otto, Boisselle & Sklar, LLP

(57) ABSTRACT

A total evaporator for fluids, including a cold chamber to prevent pre-evaporation, an evaporation region connected thereto having narrow flow cross-section for fast evaporation of the fluid, and a subsequent vapor chamber for pulsation damping and the controlled superheating of the vapor, the evaporation region being formed by a gap between concentrically nested cylindrical and/or conical tube sections and heat required for the evaporation and superheating processes is supplied by electric heating and/or by hot fluid and/or by catalytic or homogeneous combustion via the wall of the concentric tubes.

15 Claims, 2 Drawing Sheets

Figure 1:
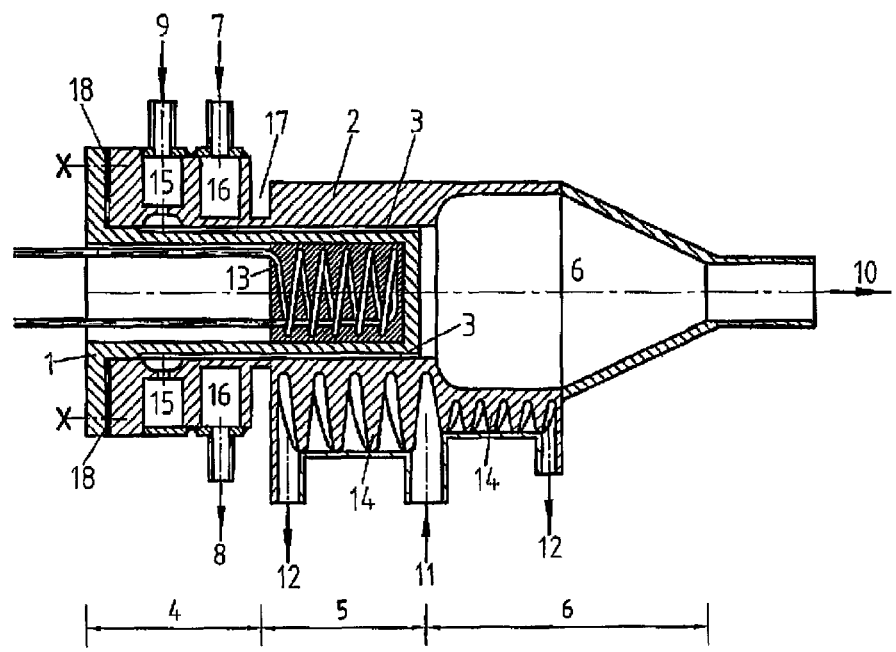

U.S. PATENT DOCUMENTS 5,035,283 A * 7/1991 Brucher et al. ............ 165/134.1
5,795,446 A * 8/1998 Kirschmann .................. 203/49
7,588,666 B2 * 9/2009 Saifutdinov et al. .............. 203/1
7,722,740 B2 * 5/2010 Klemm et al. .................. 159/49

* cited by examiner

COMPACT TOTAL EVAPORATOR AND DEVICE FOR CARRYING OUT THE CONTROLLED DRYING, EVAPORATION AND/OR REACTION OF A NUMBER OF FLUIDS

The present application is a U.S. National Stage Application under 35 U.S.C. §371 of PCT/DE2006/000866, filed on 19 May 2006, published as WO 2006/125417 on 30 Nov. 2006, the entirety of which is incorporated herein by reference.

The invention relates to a compact total evaporator, preferably for small to medium-sized flows of fluids (a few g/h to several kg/h) in a novel configuration, particularly a configuration that can be disassembled and therefore is easy to clean. In a substantially structurally identical design, the invention can also be used for the controlled mixing, evaporating and/or reaction of one or more fluids.

The controlled, continuous total evaporation of externally charged small and medium-sized flows of fluids is required in many technical applications. Examples include the targeted metering of fluid vapor in laboratory and technical facilities and in small-scale production facilities, such as remote hydrocarbon reformers for the generation of hydrogen or synthesis gas. These processes require substantially pulse-free total evaporation of the supplied fluid with fast response to load changes.

In conventional technical evaporators having a free evaporation surface, and in circulation evaporators, during the evaporation of a mixture, an evaporation process initially takes place for the lower-boiling fractions, so that that the higher boilers accumulate in the evaporator vessel until a state of equilibrium develops. This means that, in the case of multi-component evaporation, abrupt changes in the throughput are also associated with (undesirable) fluctuations in concentrations. Total evaporation therefore frequently occurs in the form of falling film evaporation in the annular gap between two concentric, heated pipes. One example of this is disclosed in DE 40 29 260 C1. However, adjusting for a uniform falling film is problematic for smaller fluid throughputs. In addition, also these annular gap evaporators, like all total evaporators, tend toward heavily pulsating vapor production, wherein larger fluid areas become overheated and then abruptly evaporate.

DE 197 23 680 B4 describes a total evaporator for small fluid flows, wherein the fluid to be evaporated is conducted first through a cold space and subsequently through a hot space in one or more capillary pipes or bores. By controlling the temperature of the cold space, pre-evaporation of fluid is reliably prevented. The total evaporation process finally takes places in the capillary pipes or bores of the heated hot space across a short section, thus achieving smooth, uniform evaporation. Furthermore, installations such as coils or wire spirals in the evaporator tubes prevent unevaporated fluid droplets from being expelled. The tubes or bores open into a vapor chamber, which acts as a pulsation damper and minimizes potential fluctuations in the vapor production.

With this device, controlled, low-pulse total evaporation can be reliably conducted across a wide throughput range. However, disadvantages include, firstly, the complex design and expensive production process using a plurality of narrow, longer bores or tubes, and the installations to be provided for each bore. Secondly, clogging of the narrow evaporation channels occurs as a result of the deposition of solids on the walls thereof, which are almost impossible to remove. The deposits may be caused by non-volatile impurities in the fluid to be evaporated or by a gradual formation of a deposit, for example as a result of the formation of cracking products during the evaporation of hydrocarbons. A further limiting factor is the electric heating or the heating by means of a fluid heat transfer medium. In particular with respect to a technical application that is more favorable from an energy point of view, it is advantageous to provide the required evaporation heat from hot waste gases or via the combustion of residual gases. In order to prevent cracking products during the evaporation of high-boiling hydrocarbons, it may further become necessary to add water or air in a targeted manner in the evaporation region.

The object is therefore to further develop the state of the art documented in DE 40 29 260 C1 and DE 197 23 680 B4 with respect to the above-mentioned problems and requirements. This objective is achieved as follows according to the invention:

In contrast to DE 40 29 260 C1, the separation of the total evaporator according to the state of the art into a cold chamber for the prevention of pre-evaporation of the fluid, a subsequent hot chamber having a narrow flow cross-section for quick evaporation of the fluid, and a subsequent vapor chamber for the controlled superheating of the vapor and for the damping of potential pulsation is substantially maintained. There is, however, a difference with respect to DE 197 23 680 B4, in which the evaporation channels are implemented by narrow bores or as thin capillary tubes. Instead of this, the evaporation process takes places either in a smooth annular chamber, or preferably, a profiled annular chamber having a small flow cross-section between two nested concentric cylindrical or conical tubes. In the case of a non-profiled annular chamber or annular chamber region, a further inventive characteristic is to provide this region with flow-conducting structures, such as wire cloth or profiled thin sheet metal.

As will be demonstrated below, a suitable design for the apparatus has the advantage that the compact evaporator is easy to open, for example in order to clean the evaporator channels, or to coat them with different catalysts. In a further embodiment, rotation or displacement of the concentric tubes in relation to one another causes the surface deposits or reaction products to loosen and be washed away without having to open the evaporator.

The heat necessary for the evaporation and superheating processes may be supplied according to the state of the art by electric heating elements in the concentric pipes, by means of a liquid or gaseous heat transfer medium and/or by the homogeneous and/or catalytic combustion of fluid fuels. In the case of a gaseous hot heat transfer medium, according to one inventive embodiment, the heat transfer medium is guided around the outer concentric pipe in a spiral manner and the heat transfer surface is enlarged by helical grooves in the outer concentric pipe. In the case of combustion of a gas, the burnable gas or the air required for combustion is likewise guided around the outer concentric tube in a spiral manner, the second reactant being supplied by metered addition in one or more locations distributed across the circumference and/or the length of the evaporation region, thus achieving uniform release of the heat. Again the heat transfer surface is advantageously enlarged by helical grooves in the outer concentric pipe. In the case of catalytic combustion, the catalyst is preferably disposed in the helical grooves or as a coating on the outside wall of the helical grooves of the outer concentric tube. The temperature required for igniting the combustion reaction can be adjusted, for example, by an electric heater that is integrated in the innermost concentric tube.

In one embodiment, the annular gap forming the evaporation section comprises channels integrated in the outside and/ or inside of the nested tubes, wherein these channels preferably extend in a straight, helical and/or zigzag and/or meander-shaped manner. The zigzag and/or meander-shaped as well as the helical configurations have the advantage that fluid droplets present on the inside of the channels are thrown continuously against the channel wall during evaporation such that, in contrast to DE 197 23 680 B4, total evaporation is achieved even without further installations in the evaporation channels. According to a particular embodiment, the helical grooves of the outside and/or inside walls are inversely configured, so that the groove-shaped channels intersect across the circumference.

If a plurality of fluids that can be dissolved in each other or cannot be dissolved in each other are to be jointly evaporated and/or mixed, a method according to the invention is such that the fluids are supplied successively in the flow direction to the annual chamber via bores or annular grooves and mixed in this way before, after or during the evaporation process. In a particular embodiment according to the invention, the fluids are distributed among different groove-shaped channels intersecting one another downstream such that they are mixed only at the intersecting point of the channels. These intersecting points are provided upstream or downstream of the start of the hot chamber, so that the fluids either evaporate in the mixed state or mix only during or after evaporation thereof.

A corresponding device can advantageously also be used to carry out reactions between the supplied liquid or gaseous or vaporous fluids. In a further embodiment of the invention, the flow channels in the annular chamber between the inner and outer tubes may be provided entirely, or in regions, with a catalyst for the reactions to be carried out. Alternatively, the reaction may also be influenced by flow-conducting catalyst structures that are inserted in the annular chamber.

Figure 2:
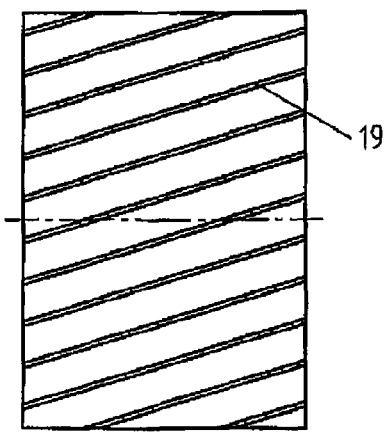
Figure 3:
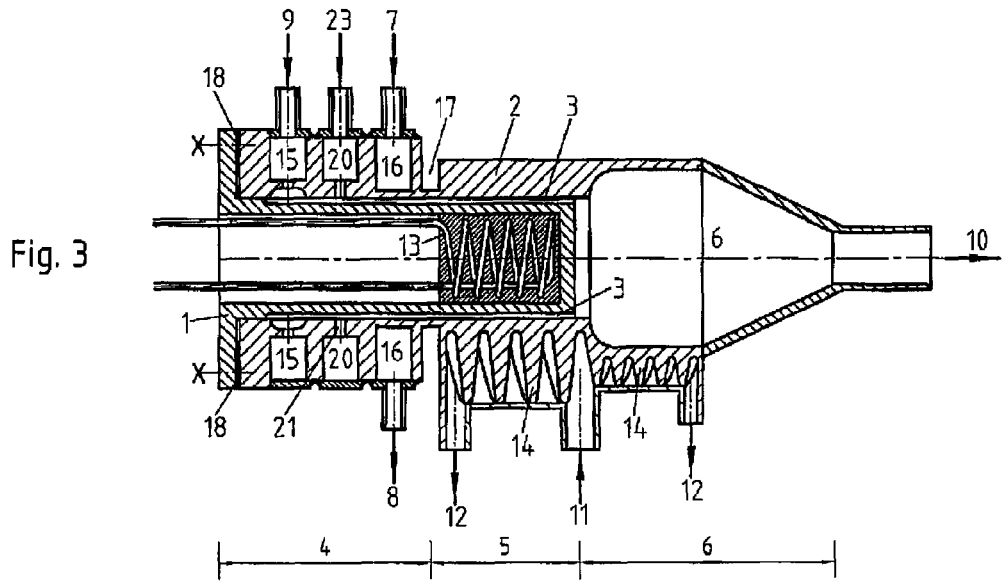
Figure 4:
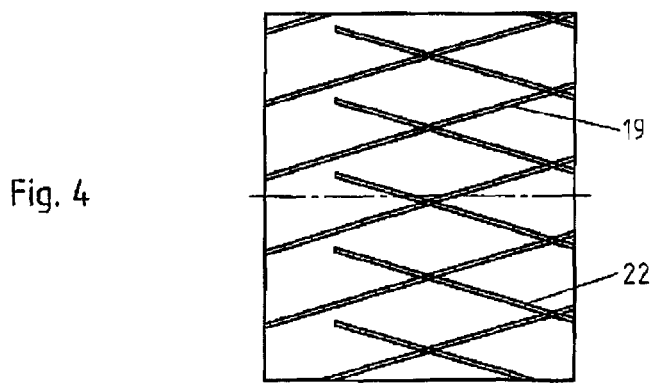

Further advantages and characteristics of the invention will be apparent from the description of exemplary embodiments provided hereinafter. The invention will be explained in more detail hereafter on the basis of figures, wherein:

FIG. 1 shows the cross-section of an inventive compact evaporator comprising electric heating (upper half) or heating by means of a hot gas or a burnable gas (lower half), FIG. 2 shows the arrangement of the outer surface of the inner tube or inner surface of the outer tube of the compact evaporator according to FIG. 1, the surface being provided with a plurality of helical grooves as flow and evaporation channels, FIG. 3 is a compact evaporator for the joint evaporation of two separately supplied fluids, or a device for the mixing, the evaporation and/or the reaction of two separately supplied fluids, FIG. 4 shows the arrangement of the intersecting flow channels for the two separately supplied fluids according to FIG. 3.

FIG. 1 shows a basic shape of the invention in a cross-sectional view, wherein the upper half has electric heating, and the lower half is heated alternatively or additionally by means of a hot gas or a burnable gas or a heat transfer fluid. The total evaporator comprises two main parts, namely the concentric outer tube 2 and the inner tube 1, which is inserted therein so as to fit precisely. The inner tube 1 is heated in the evaporation region 5 by means of the electric heater 13. In the outer surface and/or the inner surface of the outer tube, advantageously grooves 19 are integrated as flow and evaporation channels, the invention also encompassing an annular gap without integrated grooves with or without flow-conducting structures that are inserted in the annular chamber, for example such as those made of wire cloth or profiled thin sheet metal. The fluid to be evaporated enters via the inflow 9 and an annular distribution channel 15, flows through the annular gap 3 present between the inner and outer tubes (1, 2) or through the grooves 19 integrated in the inner surface of the outer tube 2 and/or outer surface of the inside tube 1 and completely evaporates in the evaporation region 5. The developing vapor travels into the vapor chamber 6, where it may be further superheated, if necessary. Potential pressure pulsations are damped upon exiting the narrow evaporation channels 19 or the annular gap 3 and upon entering the vapor chamber 6. The vapor current leaves the vapor chamber 6 via the vapor outlet 10.

The crucial aspect for low-pulse complete evaporation is that of limiting the evaporation to the evaporation region 5 and reliably preventing pre-evaporation in the distribution channel 15. This is achieved by means of a coolant, which is conducted via the inflow and outflow necks 7, 8 (which are preferably disposed tangentially) and circulated in the annular chamber 16. In addition, the hot chamber 5 is separated from the cold chamber 4 by annular grooves 17 in the outside tube 2, and optionally also in the inside tube 1, such that axial thermal conduction between the hot and cold chambers is minimized. In one embodiment, the fluid to be evaporated is supplied in a sufficiently cold state, which is to say positively below the boiling temperature, or a partial flow of the supplied fluid is circulated continuously via an external cooler (not shown). In this embodiment, the separating walls between the annular chambers 15 and 16 as well as the neck 7 are eliminated. In a further embodiment, the cooling of the cold chamber 4 is achieved by means of cooling fins provided on the outside on the cold chamber, using no additional coolant.

The evaporation channels 19 are provided on the outside of the inner tube 1 and/or on the inside of the outer tube 2 in the form of grooves. The flow cross-section of a single evaporation channel advantageously ranges between 0.05 and 3 mm$^2$ and the length thereof is between 1 and 25 cm. The number of evaporation channels 19 depends on the fluid volume to be evaporated, with the channels preferably being disposed parallel to one another and at the same distance from each other. The evaporation channels 19 preferably extend in a helical and/or zigzag and/or meander-shaped manner. As a result, fluid droplets are repeatedly thrown against the channel wall by the centrifugal force and/or the deflections and thus completely evaporate. In the case of helical guidance, each helical groove advantageously spans a circumferential region of between 60° and 360°. If the groove-shaped evaporation channels 19 are absent, evaporation occurs in the annular gap 3 between the inner and outer tubes (1, 2). In this embodiment, the gap width is preferably no more than a few tenths of a millimeter.

In FIG. 1, the inner and outer tubes 1, 2 are configured in a cylindrical shape. A conical embodiment of the two tubes has also proven to be advantageous. It ensures good thermal contact between the inner tube and outer tube if the flow occurs in the groove-shaped evaporation channels. It has been found that a cone angle of between 2° and 15° is useful, however this shall not be interpreted as a limitation of the invention. In both cases, the inner and outer tubes 1, 2 are sealed in relation to one another (for example by a gasket 18) and are connected to each other, either non-detachably or detachably, for example by means of screws. The latter allows easier disassembly for cleaning purposes in the event the evaporation channels become clogged by the formation of deposits. In addition, a catalyst disposed in the evaporation channels can be replaced.

In a further embodiment according to the invention, any developing deposits can be loosened by the periodic or continuous rotation or displacement of the inner tube relative to the outer tube and can be rinsed out with the evaporating fluid. This rinsing step is facilitated if the evaporation region 5 is configured in the form of an annular gap 3 (without groove-shaped evaporation channels 19), wherein the gap width between the cold chamber 4 and vapor chamber 6 changes continuously or in steps, or remains constant.

As is shown in FIG. 1, the electric heater 13 is advantageously provided in the form of cylindrical and/or conical heating cartridges in corresponding bores of the inner tube 1 and/or as heating trays around the outer tube 2 (not shown). In a further embodiment, a plurality of heating cartridges are disposed in corresponding bores of the inner tube. Instead of, or in addition to, the electric heater, the evaporation heat is also supplied via a hot (liquid or gaseous) fluid. In the case of a hot gas, according to the invention, the outer surface of the outer tube 2 is provided with helical windings 14. As a result, the heat transfer surface is increased, and at the same time the hot gas is distributed and conducted uniformly across the circumference. In FIG. 1, at the bottom, the hot gas supply 11 preferably occurs tangentially into an annular chamber. From there, it is conducted by the two inversely configured spirals 14 to the respective outflow necks 12. In FIG. 1, at the bottom, the two flow paths are provided with different flow cross-sections, in keeping with the varying need for heat for the evaporation and superheating processes.

The arrangement according to FIG. 1, at the bottom, can also be used if the required heat is to be produced by means of homogeneous or catalytic combustion of a burnable gas. The corresponding burnable gas/air mixture is then likewise supplied via the inflow neck 11 and is distributed appropriately to the hot chamber 5 and vapor chamber 6. Alternatively, burnable gas and/or air are supplied via the neck 11. The second reactant is then supplied or metered separately therefrom into the annular chamber, wherein the supply advantageously occurs distributed in a plurality of locations across the circumference, so that the desired axially distributed release of heat is achieved, while remaining uniform across the circumference. If the combustion reaction is catalytically supported, the catalyst is either provided in the form of a packing in the grooves of the spiral 14 or as a coating on the surface of the profiled outer tube 2. The latter ensures direct heat injection without higher excess gas temperatures. In the case of a catalytically supported combustion process, the reaction is triggered, for example, by an electric heater 13 provided in the inner tube.

If mixing of the fluid to be evaporated with other (liquid or gaseous) fluids is required before, during or directly after evaporation, this mixing step is carried out upstream of, downstream of, or in the evaporation region 5. This is shown by way of example in FIGS. 3 and 4. A corresponding procedure is advantageous, for example, if the evaporation of the fluid alone would result in the increased formation of deposits. One example is the evaporation of a hydrocarbon mixture having high-boiling fractions, such as diesel. By means of co-evaporation with water, or by supplying air or oxygen, the formation of deposits from cracking products is substantially suppressed.

Numerous possibilities exist according to the invention for the supply and mixing of the fluids to be jointly evaporated. For example, one or more fluids are supplied to the annular gap 3 via annular distribution channels 15, 20, which are disposed behind one another. In one embodiment for the joint evaporation of two fluids according to FIGS. 3 and 4, one fluid is fed to a clockwise helical groove and another fluid to a counter-clockwise helical groove 19. The two fluids are mixed at the intersecting points of the clockwise and counter-clockwise spirals. By way of suitable geometrical design of the helical grooves 19, the first intersecting point is disposed upstream of, in, or at the end of the evaporation region 5. As is shown in FIG. 1, the supply of the one fluid to be evaporated occurs via an annular channel 15 into corresponding helical evaporation channels 19. The second fluid is supplied to a separate annular chamber 20 via the inflow 23 and from there it is distributed to the flow channels 22. These channels are configured as inverse helical grooves in relation to the evaporation channels 19 and only start in the region of the annular chamber 20. The annular chamber 20 is connected by openings to the surface of the inner tube 1. These openings are positioned such that they end at the beginning of the flow channels 22 for the second fluid, so that the second fluid initially only enters these channels. As the arrangement of the helical channels according to FIG. 4 shows, the helical channels 19 and 22 intersect in the region of the hot chamber 5, so that mixing and evaporation start upstream of, downstream of, or at, the intersecting point.

Other intersecting channel configurations are also possible according to the invention, instead of inversely oriented helical grooves. In a further embodiment according to the invention, the channels 19 (or the channels 22) end at a point as early as the first intersecting points, such that the fluids are thereafter conducted in a common channel 22 (or 19).

The device described in the two preceding paragraphs and shown by way of example in FIGS. 3 and 4 can advantageously also be used for the controlled execution of chemical reactions if the fluids to be reacted are distributed among the different annular gap channels such that the reaction starts or is influenced after the fluids meet.

In a further embodiment of the invention, the flow channels in the annular chamber between the inner and outer tubes are provided entirely, or in regions, with a catalyst for the reaction to be carried out. Alternatively, the reaction is also influenced by flow-conducting catalyst structures that are inserted in the annular chamber.

If the reaction creates a large amount of heat, according to a further embodiment of the invention, the inflows 7, 11 and the outflows 8, 12 are used for the distribution and/or circulation of a suitable heat transfer medium.

Reference Numerals
1 Inner tube
2 Outer tube
3 Annular gap between inner tube and outer tube
4 Cold chamber
5 Evaporation region, heated
6 Vapor chamber
7 Coolant inflow
8 Coolant outflow
9 Fluid inflow
10 Vapor outlet
11 Hot gas inflow
12 Hot gas outflow
13 Electric heater
14 Hot gas distribution spiral
15 Fluid distribution channel (annular chamber)
16 Coolant annular chamber
17 Annular grooves to reduce axial thermal conduction
18 Gasket between outer tube and inner tube
19 Annular gap channels in the form of grooves, notches or milled recesses
20 Annular chamber for the distribution of additionally fluids
21 Feed bores for additional fluids
22 Annular gap channels for additional fluids
23 Inflow for additional fluids

The invention claimed is:

1. A total evaporator for a fluid, comprising a cold chamber to prevent pre-evaporation, an evaporation region connected to the cold chamber and having a narrow flow cross-section for fast evaporation of the fluid, and a subsequent vapor chamber connected to the evaporation region for pulsation damping and controlled superheating of the vapor, wherein the narrow flow cross-section comprises a gap formed between concentrically nested cylindrical and/or conical tube sections and the heat required for the evaporation and superheating processes is supplied by one or a combination of two or more of electric heating, a hot fluid, catalytic combustion, and homogeneous combustion via a wall of the concentrically nested cylindrical and/or conical tube sections.

2. The total evaporator according to claim 1, wherein the concentric tube sections in the evaporation region are nested and that individual evaporation channels are incorporated in inner and/or outer walls of the concentrically nested tube sections.

3. A total evaporator according to claim 2, wherein a cross-section of the individual evaporation channels is between 0.05 and 3 mm$^2$, in that a channel length thereof is 10 to 250 mm, and in that the evaporation channels span a circumferential angle ranging between 0° and 360°.

4. A total evaporator according to claim 1, wherein the concentrically nested tube sections are permanently connected to one another by means of one or a combination of two or more of shrink fitting, soldering or welding.

5. A total evaporator according to claim 1, wherein the nested concentric tubes forming the walls of the evaporation region are displaced in relation to one another continuously or at periodic intervals, axially and/or in the circumferential direction.

6. A total evaporator according to claim 1, wherein the evaporation heat is introduced by a hot gas via an outer one of the concentrically nested cylindrical and/or conical tube sections, the hot gas being conducted in a spiral manner around the outer tube by outer grooves provided on the outer tube.

7. A total evaporator according to claim 1, further comprising a cooling device, wherein, in the cold chamber, pre-evaporation of the fluid is prevented by temperature of the cold chamber being controlled by the cooling device.

8. A total evaporator according to claim 1, wherein, in the cold chamber, pre-evaporation of the fluid is prevented by a portion of the fluid to be evaporated being continuously recirculated via an outer cooler.

9. A total evaporator according to claim 1, wherein the concentrically nested cylindrical and/or conical tube sections are adapted to be rotated, displaced in relation to each other, and/or detached from one another.

10. A total evaporator for a fluid, comprising a cold chamber to prevent pre-evaporation, an evaporation region connected to the cold chamber and having a narrow flow cross-section for fast evaporation of the fluid, and a subsequent vapor chamber connected to the evaporation region for pulsation damping and controlled superheating of the vapor, wherein the narrow flow cross-section comprises a gap formed between concentrically nested cylindrical and/or conical tube sections and the heat required for the evaporation and superheating processes is supplied by one or a combination of two or more of electric heating, a hot fluid, catalytic combustion, and homogeneous combustion via a wall of the concentrically nested cylindrical and/or conical tube sections, wherein the evaporation region comprises channels in one or a combination of two or more of a zigzag form, a meander-shaped form, a straight form and a helical form, and wherein the channels comprise simple grooves, intersecting grooves or a combination thereof.

11. A total evaporator for a fluid, comprising a cold chamber to prevent pre-evaporation, an evaporation region connected to the cold chamber and having a narrow flow cross-section for fast evaporation of the fluid, and a subsequent vapor chamber connected to the evaporation region for pulsation damping and controlled superheating of the vapor, wherein the evaporation region is formed by a gap between concentrically nested cylindrical and/or conical tube sections and the heat required for the evaporation and superheating processes is supplied by one or both of catalytic combustion and homogeneous combustion via a wall of the concentrically nested cylindrical and/or conical tube sections, wherein a gas comprising oxygen and/or burnable fuel is conducted through helical outer grooves, and is combusted in the grooves homogeneously or on a catalyst, the gas being supplied either in a premixed state or the gas comprising the oxygen being supplied from a plurality of locations.

12. The total evaporator according to claim 11, wherein temperature required for triggering combustion is produced by electrical heating of the concentrically nested cylindrical and/or conical tube sections.

13. A total evaporator according to claim 11, wherein the evaporation region comprises channels in one or a combination of two or more of a zigzag form, a meander-shaped form, a straight form and a helical form, and wherein the channels comprise simple grooves, intersecting grooves or a combination thereof.

14. A method of total evaporation of fluids comprising subjecting the fluids to a total evaporator for fluids and then completely evaporating the fluids in said total evaporator, wherein the total evaporator comprises a cold chamber to prevent pre-evaporation, an evaporation region connected to the cold chamber and having a narrow flow cross-section for fast evaporation of the fluid, and a subsequent vapor chamber connected to the evaporation region for pulsation damping and controlled superheating of the vapor, wherein the evaporation region is formed by a gap between concentrically nested cylindrical and/or conical tube sections and the heat required for the evaporation and superheating processes is supplied by one or a combination of two or more of electric heating, a hot fluid, catalytic combustion, and homogeneous combustion via the wall of the concentrically nested cylindrical and/or conical tube sections.

15. A method according to claim 14, wherein the evaporation region comprises channels in one or a combination of two or more of a zigzag form, a meander-shaped form, a straight form and a helical form, and wherein the channels comprise simple grooves, intersecting grooves or a combination thereof.

* * * * *

UNITED STATES PATENT AND TRADEMARK OFFICE
CERTIFICATE OF CORRECTION

PATENT NO. : 8,377,257 B2  Page 1 of 1
APPLICATION NO. : 11/914769
DATED : February 19, 2013
INVENTOR(S) : Eigenberger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1308 days.

Signed and Sealed this
First Day of September, 2015

Michelle K. Lee
*Director of the United States Patent and Trademark Office*